Patented Feb. 14, 1950

2,497,063

UNITED STATES PATENT OFFICE 2,497,063

PROCESS FOR THE PRODUCTION OF ALKALI METAL PHYTATES

Neal E. Artz, Oak Park, Ill., assignor to Corn Products Refining Company, New York, N. Y., a corporation of New Jersey No Drawing. Application March 17, 1947, Serial No. 735,240

4 Claims. (Cl. 260—461)

This invention relates to the preparation of alkali metal phytates. More particularly, it relates to the preparation of such phytates from magnesium phytate.

An object of the present invention is to provide a simple and effective method for the preparation of alkali metal phytate directly from magnesium phytate. The magnesium phytate which is satisfactory for the purpose of the present invention is obtained as a precipitate from the treatment of corn steep liquor with magnesium hydroxide. Thus, when corn steep liquor is neutralized with magnesium hydroxide the precipitates that form are crude salts of phytic acid consisting mainly of magnesium phytate but a small amount of calcium may be contained therein.

Heretofore, sodium phytate, for example, has been prepared from metal phytates, such as calcium phytate, by first converting the calcium phytate to iron phytate. This is effected by dissolving the calcium phytate in hydrochloric acid of proper concentration and adding to such solution a solution of ferric chloride in hydrochloric acid. Thereupon, iron phytate precipitates. The iron phytate, after being separated, is suspended in water and to this suspension is added a solution of sodium hydroxide, whereupon insoluble ferric hydroxide is formed and remains in suspension in the alkaline solution. This is separated and the sodium phytate is recovered from the filtrate by adding alcohol thereto. This causes the sodium phytate to separate as a heavy sirup in the bottom layer. If the sirup is cooled somewhat below room temperature, or is allowed to stand for some time at room temperature, crystals of sodium phytate may form thereupon.

My invention represents an improvement over such complicated procedure, and by means of my invention, alkali metal phytate may be prepared directly from magnesium phytate.

The process of the present invention comprises reacting magnesium phytate with a solution of alkali metal hydroxide, and recovering the alkali metal phytate; the alkali metal hydroxide being present in a ratio which will provide at least 2 mols of alkali metal hydroxide for each atom of phytic acid phosphorus present in the phytate.

The magnesium phytate and the alkali metal hydroxide and the water necessary to provide the alkali metal hydroxide solution may be mixed in any order.

The reaction is exothermic and begins at room temperature. It is preferable to mix the reactants at such dilution of alkali metal hydroxide that the temperature of the reaction mass does not rise about about 120° F. If the temperature of the reaction mass rises above 120° F., it is difficult to filter the magnesium hydroxide formed during the reaction at the higher temperature. However, high temperatures do not detrimentally affect the reaction itself between the alkali metal hydroxide and the magnesium phytate, nor does an excess amount of alkali metal hydroxide have a detrimental effect.

The time required for the reaction to be completed is at least about 1 hour after the reactants have been mixed together.

After the reaction is completed, the magnesium hydroxide is separated, as by filtration, from the remaining liquor which contains the desired alkali metal phytate in solution. The magnesium hydroxide cake is then washed. Alcohol is then added to the liquor including the washings in amount, usually about 10 percent to about 25 percent of its volume, sufficient to produce the maximal separation of alkali metal phytate as a sirup. The alcohol requirement is higher for potassium phytate than for sodium phytate. The mixture is then allowed to stand and within a short time, the liquid will separate into two layers—the heavy alkali metal phytate layer being on the bottom. The upper layer is drawn off and saved for the recovery of alcohol which may be used in a subsequent reaction. The heavy alkali metal phytate layer, which is sirupy in nature, may be used directly or it may be dried by passing over heated rolls or it may be allowed to crystallize and the alkali metal phytate crystals recovered in conventional manner.

If it is desired to obtain alkali metal phytate in its crystalline form, rather than as a sirup, the specific gravity of the solution containing the alkali metal phytate, after removal of magnesium hydroxide, may be adjusted by concentration to a point at which crystals may begin to form when the solution cools. The addition of not more than 10 percent of its volume of ethyl alcohol to such a solution may cause separation of a larger crop of crystals of alkali metal phytate without causing the separation of two liquid phases.

The alkali metal phytate thus obtained may contain traces of free alkali metal hydroxide which changes to alkali metal carbonate on contact with air. If a product of greater purity is desired, the alkali metal phytate may be redissolved in water, alcohol added thereto and the resultant mixture treated, as above described.

Among the alcohols which may be employed for recovering alkali metal phytate, in accordance with the present invention, are methyl alcohol, ethyl alcohol and isopropyl alcohol.

Any grade of reactants may be used, the commercial grades being quite satisfactory.

Any equipment which is resistant to alkali is suitable for purposes of the present invention.

The following examples which are intended as informative and typical only and not in a limiting sense will further illustrate the invention, which is intended to be limited only in accordance with the scope of the appended claims. Where reference is made to amounts of phytic acid phosphorus, determination thereof was carried out according to the method of Heubner and Stadler, Biochem. Z., 64, 422-37.

*Example 1.*—Commercial magnesium phytate was prepared by adding magnesium hydroxide to corn steep liquor in amount to adjust the pH value thereof to 6.5. The precipitate which formed was separated, washed, and dried in conventional manner. To 500 grams of such magnesium phytate (containing 83.5 g. of phytic acid phosphorus) slurried in 1200 ml. of water was added with stirring a solution made by dissolving 230 g. of sodium hydroxide in 800 ml. of water. The temperature of the reactants was about 70° F. and the temperature of the reaction mass rose to about 85° F. during the reaction. The mixture was allowed to stand for 2 hours. The solids were then separated by filtration. Determination of the phytic acid phosphorus in an aliquot of the filtrate showed 96 percent conversion of the magnesium phytate to sodium phytate. To the filtrate, one-fifth its volume of isopropyl alcohol was added and mixed in thoroughly. A heavy sirup of sodium phytate separated, which set up to a mass of crystalline sodium phytate on standing overnight.

*Example 2.*—Twenty liters of magnesium phytate slurry containing 250 g. of phytic acid phosphorus was treated with 3.5 l. of a solution containing 640 g. of sodium hydroxide, the magnesium phytate being prepared according to the method described in Example 1. The reactants were mixed at room temperature and during the reaction the temperature of the reaction mass rose about 15° F. After standing overnight the solids were separated by filtration. Titration of an aliquot of the filtrate showed 97 percent conversion of the magnesium phytate to sodium phytate. Twenty percent of its volume of isopropyl alcohol was mixed with the filtrate and the heavy layer of sodium phytate sirup was drawn off and dried by passing over heated rolls to an almost white, flaky powder.

*Example 3.*—Sixty-four grams of potassium hydroxide was dissolved in 700 ml. of water and 100 g. of magnesium phytate, prepared according to the method described in Example 1, was slurried into the resulting solution. The temperature of the reaction mass rose to about 85° F. After standing 1 hour, the solution was filtered and the cake was washed with hot water until the volume of filtrate and washings amounted to 1 liter. Determination of phytic acid phosphorus in an aliquot of this solution showed 100 percent conversion of the phytic acid phosphorus of the magnesium phytate to soluble potassium phytate. Addition of ethyl alcohol to the filtrate caused separation of the potassium phytate as a thick sirup in a manner analogous to the behavior of sodium phytate solutions subjected to such treatment.

I claim:

1. The process which comprises mixing a magnesium phytate precipitate obtained from the treatment of corn steep liquor with magnesium hydroxide, with a highly diluted aqueous solution of an alkali metal hydroxide to effect a chemical reaction between said magnesium phytate and said alkali metal hydroxide, the proportions of said reactants being at least 2 mols of alkali metal hydroxide for each atom of phytic acid phosphorus present in said magnesium phytate precipitate, the temperature during the reaction being maintained at less than about 120° F., and the time during which the reaction is effected being at least about one hour.

2. The process according to claim 1 wherein the magnesium hydroxide formed during the reaction is separated and the alkali metal phytate is recovered from the remaining liquor by adding thereto an alcohol selected from the group consisting of methyl alcohol, ethyl alcohol and isopropyl alcohol in an amount of from 10 to 25 per cent by volume of the liquor to which said alcohol is added.

3. The process which comprises mixing a slurry in 1200 ml. of water of 500 grams of a magnesium phytate precipitate containing 83.5 grams of phytic acid phosphorus and obtained by the treatment of corn steep liquor with magnesium hydroxide, with a solution of 230 grams of sodium hydroxide in 800 ml. of water, maintaining the temperature during the reaction at between 70° F. and 85° F., and allowing the mixture to stand for about 2 hours.

4. The process which comprises mixing 100 grams of a magnesium phytate precipitate containing 16.7 grams of phytic acid phosphorus and obtained by the treatment of corn steep liquor with magnesium hydroxide, with a solution of 64 grams of potassium hydroxide in 700 ml. of water, maintaining the temperature of the reaction at not in excess of 85° F., and allowing the mixture to stand for 1 hour.

NEAL E. ARTZ.

REFERENCES CITED

The following references are of record in the file of this patent:

UNITED STATES PATENTS

| Number | Name | Date |
|---|---|---|
| 1,644,246 | Gams et al. | Oct. 4, 1927 |